United States Patent [19]

Kawai

[11] Patent Number: 4,990,941
[45] Date of Patent: Feb. 5, 1991

[54] DUPLEX PRINT APPARATUS

[75] Inventor: Yoshihisa Kawai, Osaka, Japan

[73] Assignee: Minolta Camera Kabushiki Kaisha, Osaka, Japan

[21] Appl. No.: 176,184

[22] Filed: Mar. 31, 1988

[30] Foreign Application Priority Data

Apr. 2, 1987 [JP] Japan ................... 62-82573
Apr. 2, 1987 [JP] Japan ................... 62-82574

[51] Int. Cl.$^5$ ........................................ G03G 15/00
[52] U.S. Cl. .................... 346/153.1; 355/319; 355/320
[58] Field of Search ............ 355/3 SH, 14 SH, 23, 355/24, 25, 318, 319, 320; 291/3.1, 185, 186; 346/153.1, 160

[56] References Cited

U.S. PATENT DOCUMENTS

| 4,334,765 | 6/1982 | Clark | 355/14 SH |
| 4,487,506 | 12/1984 | Repp et al. | 355/24 X |
| 4,538,906 | 9/1985 | Brown | 355/14 SH |
| 4,568,169 | 2/1986 | Wada et al. | 355/3 SH |
| 4,730,206 | 3/1988 | Sawada et al. | 355/3 SH |

FOREIGN PATENT DOCUMENTS 60-204379 10/1985 Japan .

Primary Examiner—A. C. Prescott
Attorney, Agent, or Firm—Burns, Doane, Swecker & Mathis

[57] ABSTRACT

A duplex printer receives image data for both odd and even pages, prints the image data for odd pages on one side of each sheet of a stack of sheets, reverses and stores the stack of sheets, and prints the image data for the even pages on the other side of the sheets of the stack of sheets.

31 Claims, 8 Drawing Sheets

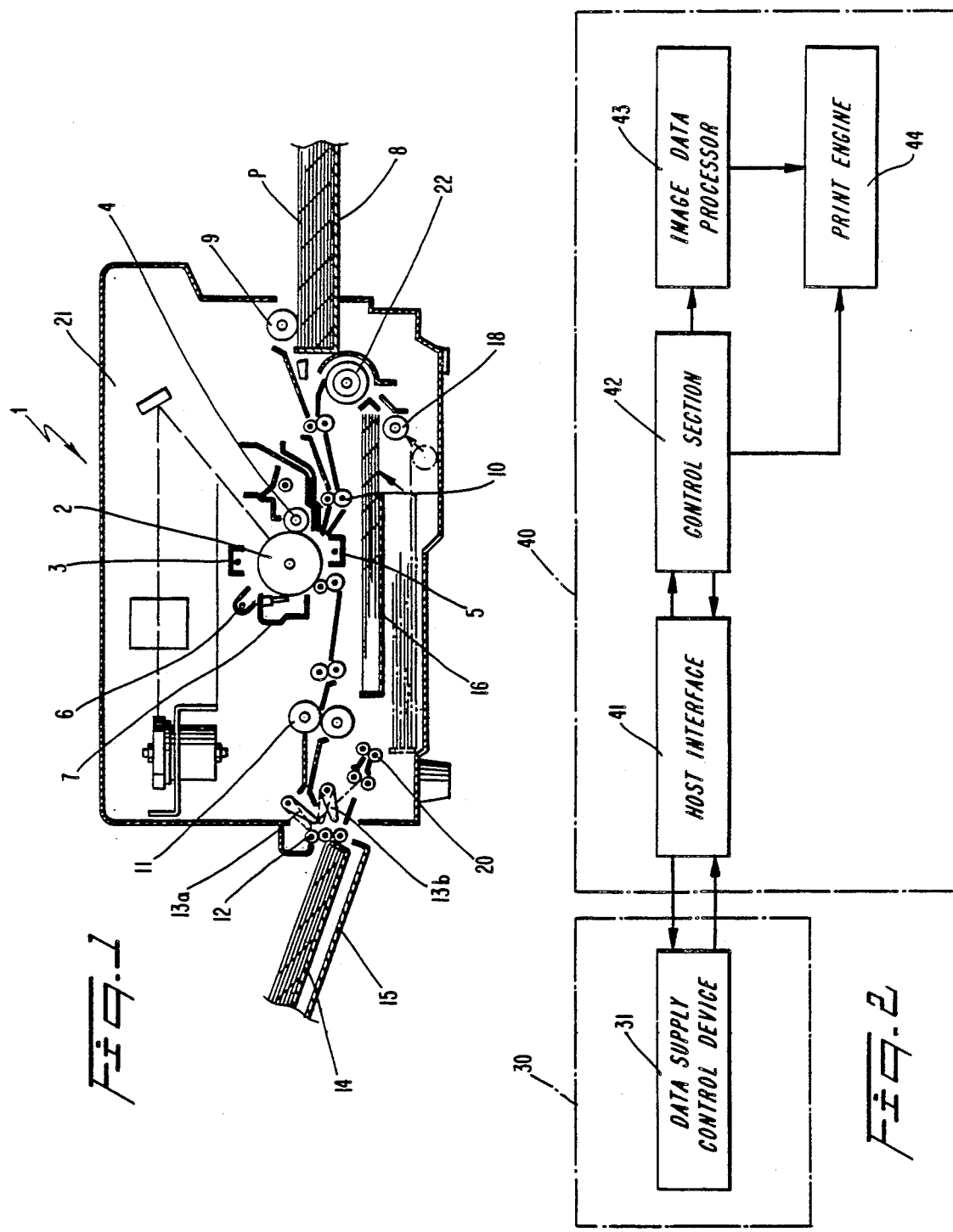

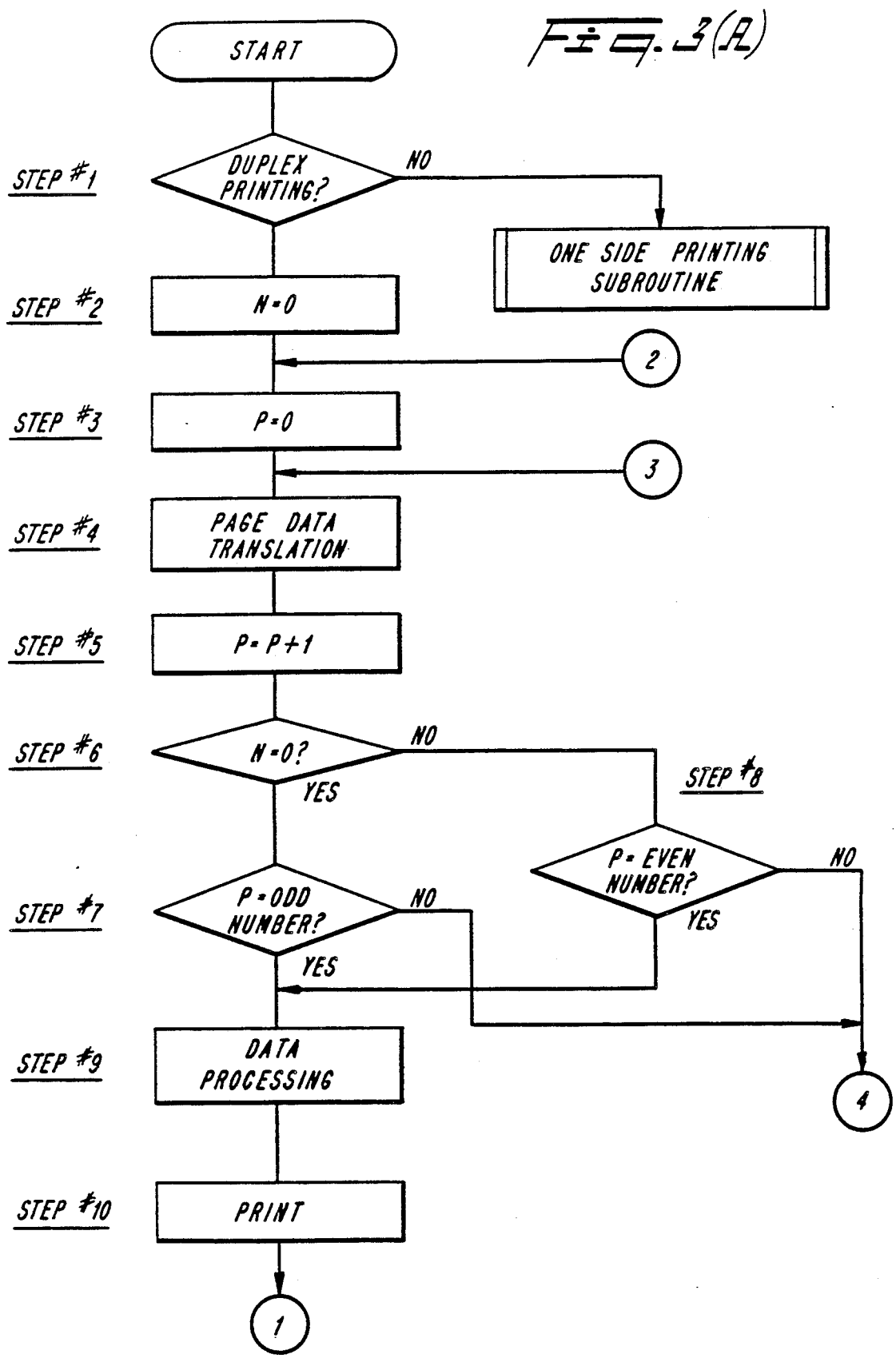

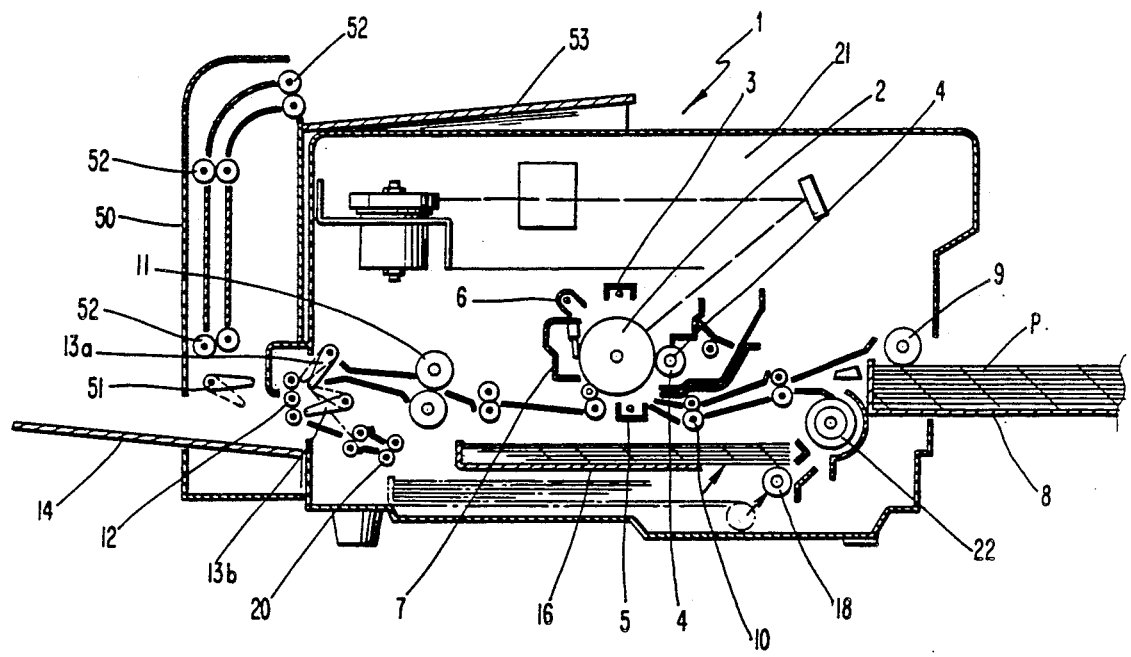
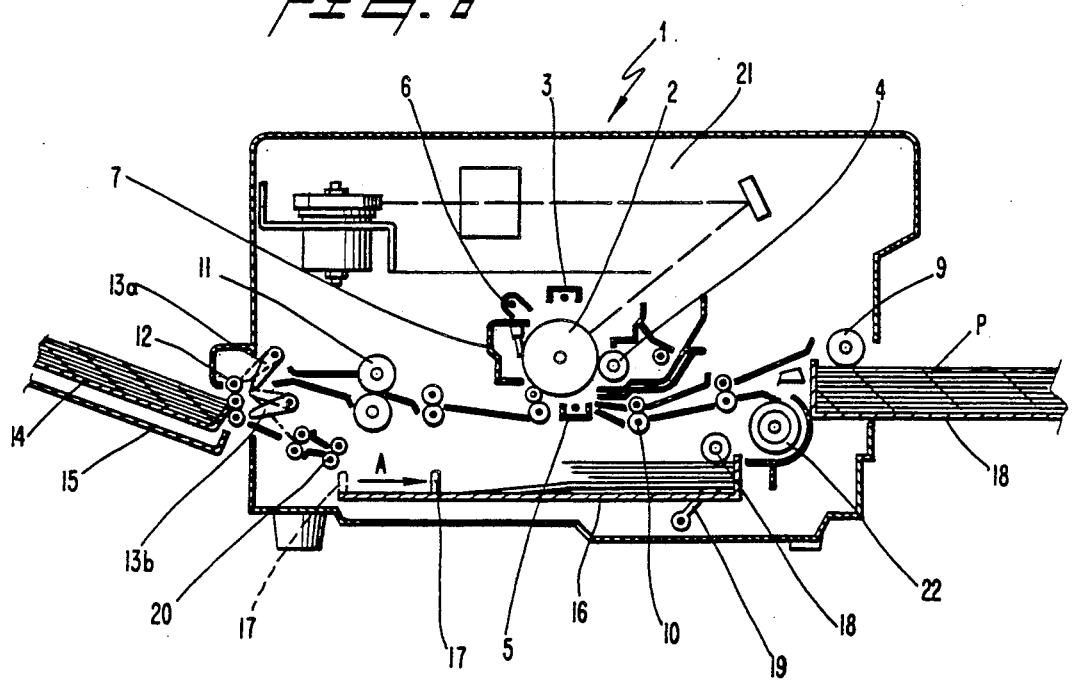

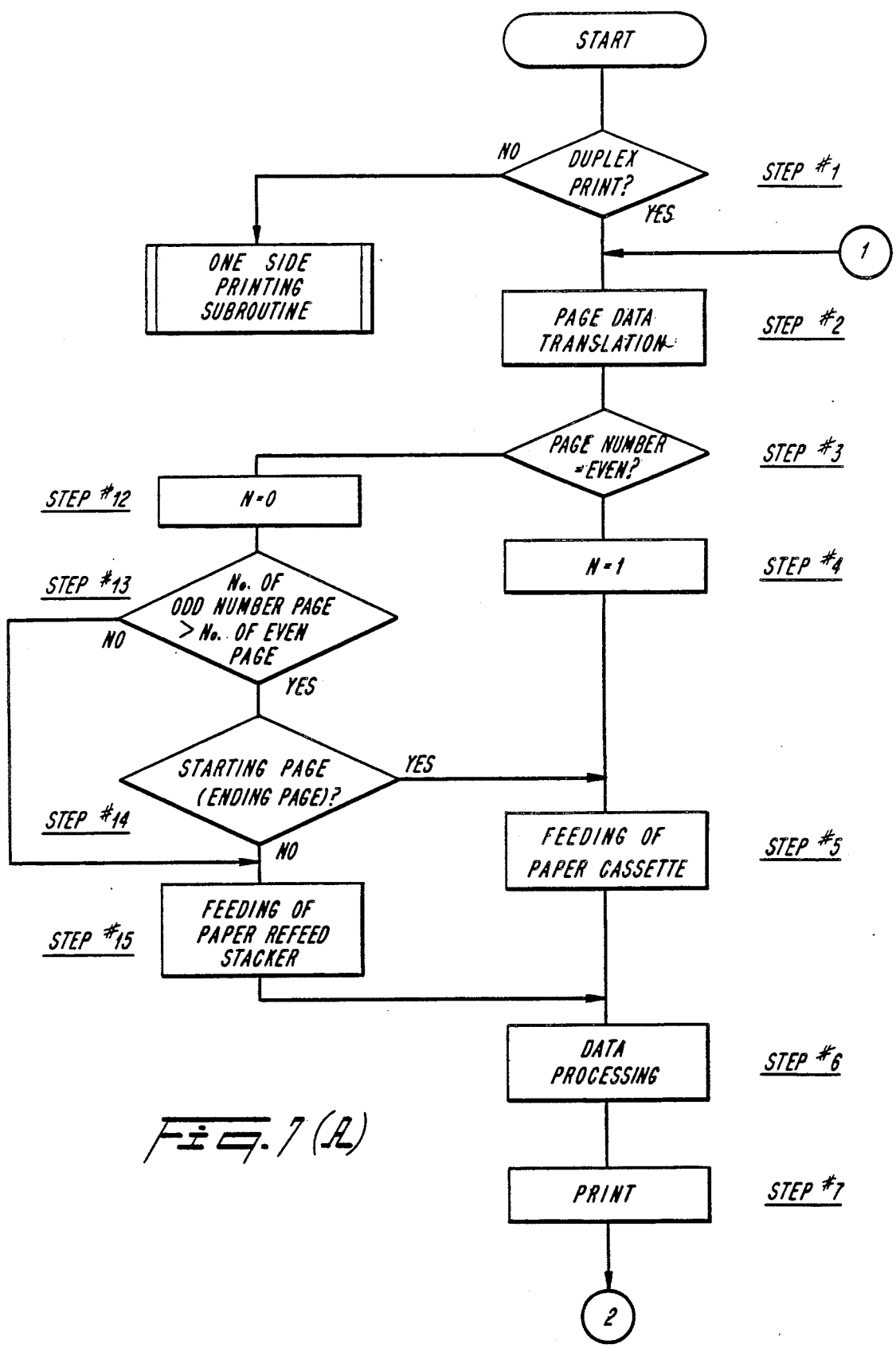

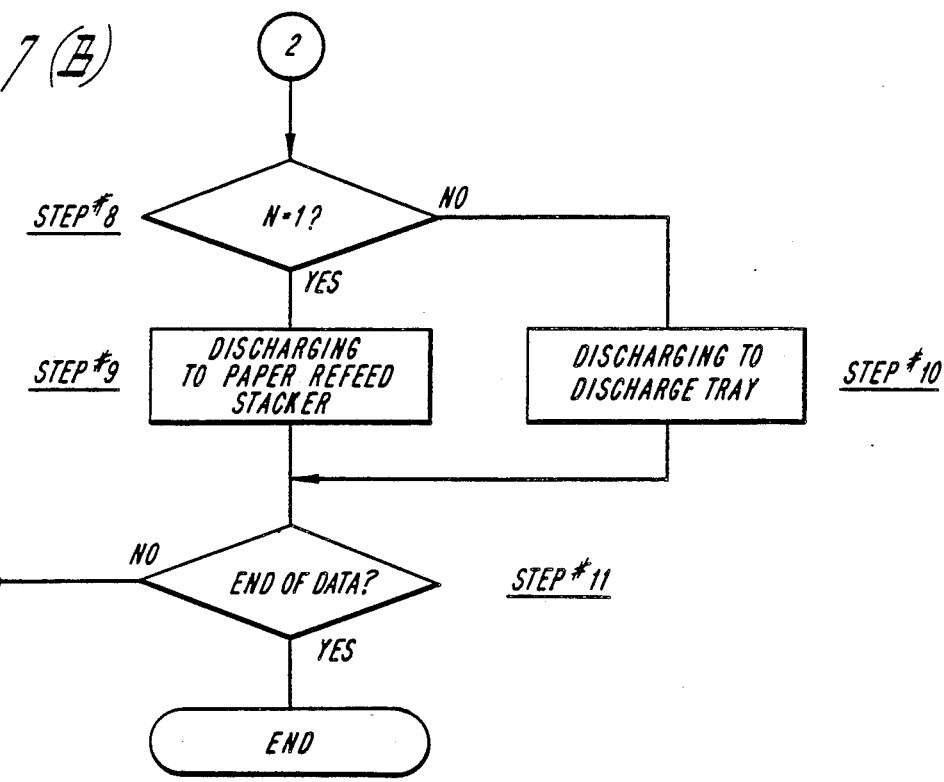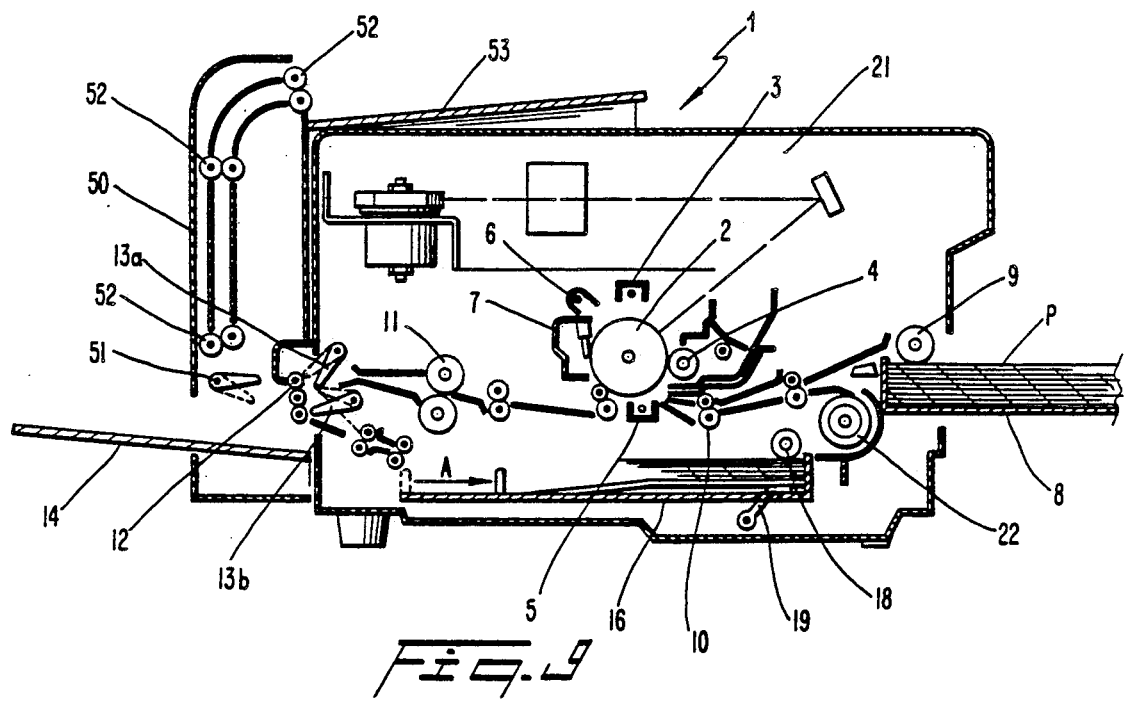

DUPLEX PRINT APPARATUS

BACKGROUND OF THE INVENTION

1. Field of the Invention

The present invention relates to a duplex print apparatus designed to receive image data from a data processor such as a host computer or the like to print on both sides by means of a printer having a paper refeed stacker.

2. Description of Related Art

A laser printer is designed to form a latent image by picture elements on a photosensitive drum by way of a laser beam which is deflected by a polygon mirror rotating at high speed to obtain a visible image by toner developing and to fix it after transferring it onto a usual paper. Since fast modulation of the laser beam is possible, fast and high-quality (high-density) printing and graphic recording can be realized. Therefore, the laser printer is widely used as an output device of various data processing systems and image processing systems utilizing computers.

Meanwhile, in order to make good use of filing spaces and to save paper costs in conducting office work, a demand for duplex printing where the printing or copying can be made on both sides of the paper is becoming stronger. A most simple way to print on both sides of the paper by the laser printer is, for example, to print a first page on one side of the paper being fed, thereafter the paper is reversed in a paper circulation path in the laser printer so that a second page is printed on the reversed side of the same paper. In this method, however, since the circulation path becomes extremely longer as compared with the paper, it takes time to reverse the paper, thus requiring longer printing time.

For solving such a problem, it has been proposed to make the circulation path possible to pass a plurality of sheets, e.g. 3 sheets at a time, and to print first, third and fifth page successively on one side of each sheet, then to print second, fourth and sixth page successively on the other side of each reversed sheet. However, the number of papers present in the circulation path changes dependent on each printer, and even in the same printer, processing time of a character/picture processor for controlling the print portion changes dependent on contents to be processed, thereby the number of papers in the circulation path is also changed. Since printing conditions are changed dependent on each printer and its using condition as such, it is very complicated or practically impossible to control the sequence of pages of the image data transferred, on the host computer side.

Likewise, though it may be considered to transfer the image data in order from the host computer side and temporarily storing the data to be printed on the rear side of the paper on the printer side, in such a method, an image memory for several pages is required on the printer side, resulting in a high printer cost.

SUMMARY OF THE INVENTION

The present invention is directed to solve the problem aforementioned, therefore, it is an object of the present invention to provide a duplex print apparatus through which, by utilizing image data for a plurality of pages twice, effective duplex printing can be accomplished in a short time.

It is another object of the present invention to provide a duplex print apparatus which is low in cost by utilizing an image memory for one page to accomplish duplex printing.

The above and further objects and features of the present invention will more fully be apparent from the following detailed description with accompanying drawings.

BRIEF DESCRIPTION OF THE DRAWINGS

FIG. 1 is a sectional view of a laser printer as an image forming means of a duplex print apparatus in the first embodiment of the present invention.

FIG. 2 is a block diagram showing the construction of a control device of a duplex print apparatus of the present invention.

FIGS. 3A and 3B are a flow chart showing the content of control in the first embodiment of the present invention.

FIG. 5 is a sectional view showing a laser printer having a reversible discharge device added thereto in the first embodiment of the present invention.

FIG. 6 is a sectional view showing a laser printer in the second embodiment of the present invention.

FIGS. 7A and 7B are a flow chart showing the content of control in the second embodiment of the present invention.

FIG. 9 is a sectional view showing a laser printer having a reversible discharge device added to thereto in the second embodiment of the present invention.

DESCRIPTION OF THE PREFERRED EMBODIMENTS

Figure 3B:
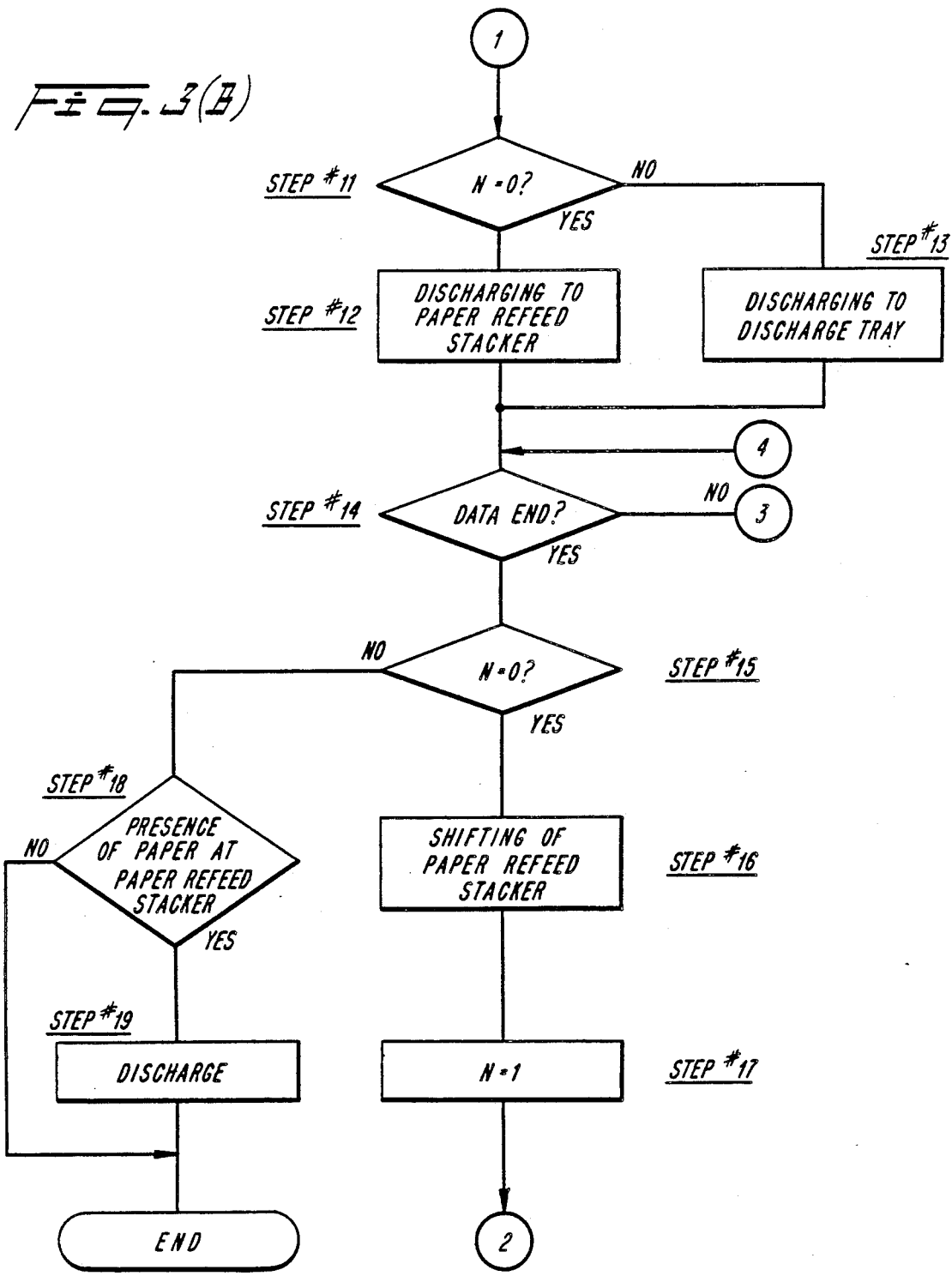

The present invention will be described hereinbelow with reference to the drawings showing the embodiments.

FIG. 1 is a sectional view showing a laser printer in the first embodiment used in a duplex print apparatus, (hereinafter to be referred as the present apparatus), according to the present invention. In the drawing, there is indicated at 1 the laser printer whose center portion is provided with a photosensitive drum 2 coated with an organic photoconductive material, or vaporized with a photoconductive material such as selenium or the like on the surface thereof, a latent image being formed by way of a laser beam on the surface. Around the photosensitive drum 2, there are provided a charger 3 for applying a prescribed uniform charge to the photosensitive drum 2, a developing device 4 for developing the latent image formed by the laser beam by sticking a toner thereto, a transfer charger 5 for transferring the toner sticking to the developed photosensitive drum 2, a cleaner blade 6 for removing the residual toner after transferring and an eraser 7 for irradiating light to the photosensitive drum 2 in order to remove residual charge. A printing means comprises the photosensitive drum 2, charger 3, developing device 4, transfer charger 5, cleaner blade 6 and eraser 7.

Meanwhile, on one side of the laser printer 1, a paper cassette 8 for storing paper P to be printed is mounted with its one end being inserted into the one end of the laser printer 1. A paper feed roller 9 for feeding the paper P to the printing means is disposed above the inserting portion of the paper cassette 8, whereby the paper P is conveyed to the printing means through a conveying path. Likewise, in the conveying path before the printing means, a register roller 10 for determining the print position of paper relative to a subscanning direction (a scanning direction of the laser beam relative to the paper is the main scanning direction, whereas a direction perpendicular thereto is the subscanning direction) is disposed. Additionally, on the paper discharge side of the printing means in the conveying path, a fix roller 11 for fixing the toner transferred to the paper P by the transfer charger 5 is disposed. On the paper discharge side of the fix roller 11, gate clicks 13a, 13b for switching the conveying path in order to discharge the paper P onto either upper or lower discharge tray 14, 15 disposed on the side of the laser printer 1 opposing the paper cassette 8 are provided. The gate clicks 13a, 13b also serve to guide the discharged paper P to a paper refeed stacker 16 to be described later. Furthermore, on the discharge side of the gate clicks 13a, 13b a discharge roller 12 for sending the paper P to either upper or lower discharge tray 14, 15 is disposed.

A sheet feeding means comprises the paper feed roller 9, register roller 10, fix roller 11, discharge roller 12 and gate clicks 13a, 13b.

Under the printing means, the paper refeed stacker 16 as a store means for storing the paper P printed on one side thereof by reversing both sides thereof is disposed to temporarily store prescribed sheets of paper P. The paper refeed stacker 16 includes a storing position (indicated in broken lines) for storing the paper P printed on one side thereof, and a refeed position (indicated in full lines) located above the storing position for refeeding the stored paper P to the printing means, movement of the paper refeed stacker between the two positions being effected by means of a lift member (not shown).

Underneath the paper P stored in the paper refeed stacker 16, a paper refeed roller 18 as a refeed means contacting the paper P is disposed, and on its discharge side a reverse roller 22 for guiding the paper P discharged from the paper refeed stacker 16 by the refeed paper roller 18 is disposed.

An image forming means comprises the sheet feed means, the printing means, the store means and the paper refeed means.

Meanwhile, an optical scanning system 21 comprises well-known means such as a laser diode, polygon mirror, lens and mirror, whereby the laser beam modulated corresponding to the image signal scans the surface of the photosensitive drum 2.

FIG. 2 is a block diagram showing the construction of a control device of the present apparatus, wherein a data supply control device 31 as first and third control means disposed in a host computer 30 as an image data supply means, and controlling the output of image data from the host computer 30 is connected in both directions through a host interface 41, to a control section 42 provided in the laser printer 1 and controlling a print engine 44 to be described later. The control section 42 is connected respectively to an image data processor 43 and the print engine 44 which are also interconnected. Second and fourth control means as a print control means 40 comprise the host interface 41, the control section 42, the image data processor 43 and the print engine 44.

Next, operation of the first embodiment of the present apparatus constructed as aforementioned will be described.

In the laser printer 1, the paper P in the paper cassette 8 is sent out by the paper feed roller and is fixed by the fix roller 11 after the image data is transferred on one side thereof by the photosensitive drum 2. Then the paper P is guided by the gate clicks 13a, 13b, and is discharged to the lower discharge tray 15. On its way, the paper P is detected by a sensor (not shown) just before its rear end passes the discharge roller 12 to switch, the gate clicks 13a, 13b from the position indicated in full lines to that indicated in broken lines shown in FIG. 1. Then, the discharge roller 12 is rotated reversely and the paper P is fed to the paper refeed stacker 16 at the storing position by the guide roller 20, and stored therein. When refeeding the paper, the paper refeed stacker 16 is lifted to the refeeding position by said lift member, and the paper P is sent to said printing means through the reverse roller 22 from the bottom in the paper P's stored order by means of the rotation of the paper refeed roller 18 contacting under the paper P. The image data associated with the image data transferred on the one side is transferred on the reverse side of the paper P. Thus duplex printing is completed.

Likewise, image data for a plurality of pages are produced from the host computer 30 and supplied to the laser printer 1 together with the control data by the supply control device 31 according to prescribed procedures. In the laser printer 1, the host interface 41 temporarily stores the data consisting of image data for a plurality of pages and the control data supplied from the supply control device 31 in a unit of page, and the control section 42 controls the print engine 44 by the control data out of these data and sends image data to the image data processor 43. In the image data processor 43, bit data of the image processed in synchronism with the operation of print engine 44 is transferred thereto. In the print engine 44, the laser diode of the optical scanning system 21 are modulated for printing. And at the same time on the basis of control data from the control section 42, control for feeding and refeeding the paper P and the other controls and operations necessary for printing are performed.

Now, the image data to be printed is transferred twice from its first page in order from the host computer 30. At the first time, the laser printer 1 prints only the image data of odd pages on one side of the paper fed from the paper cassette 8 successively and stacks them temporarily in the paper refeed stacker 16. At the second time, the laser printer 1 feeds the paper from the paper refeed stacker 16 to print the image data of even pages on other side thereof before discharging to the upper discharge tray 14.

FIG. 3 shows a flow chart of the control section 42 for conducting printing operation aforementioned.

In FIG. 3, in the Step #1, it is determined whether or not to perform duplex printing, if no, a subroutine for one side printing is executed, if yes, the Step #2 and the following steps are executed. In the Step #2, a flag N is set at zero and in the Step #3, a variable P is set at zero. In the Step #4, data for one page is transferred and the variable P is incremented by 1 in the Step #5. In the Step #6, it is determined whether or not the flag N is zero. In the case of flag N being zero, when the variable P is determined to be odd number in the Step #7, the paper is stacked in the paper refeed stacker 16 after executing data processing (Step #7) and printing (Step

10), and when the variable P is determined to be even number, these processings are not executed. The above processings are continued till the first data transfer is completed in the Step #14. Meanwhile, the paper at this time is fed from the paper cassette 8.

When the first data transfer is finished (Step #14), switching is performed for refeeding the paper from the paper refeed stacker 16 (Step #16), and the processing return to the Step #3 after setting the flag N at "1" (Step #17). In the second processing, since the flag N is not zero, it is determined No in the Step #6 so the data processing (Step #9) and printing (Step #10) are performed when the variable P is even number, and the paper is discharged to the discharge tray 14 (Step #13). When the variable P is odd number these processings are not performed. When it is determined in the Step #14 that the second data transfer is completed, the paper remained in the paper refeed stacker 16 is discharged (Step #18, Step #19) to finish processing. Processings in the Step #18 and Step #19 are intended to prevent the last page from remaining in the paper refeed stacker 16 when the last page of all data after the data transfer is the odd one.

Meanwhile, in the image data processor 43, with the control from the control section 42, the image data of odd pages are processed to be turned upside down from that of even pages, thereby bringing the direction of image in agreement with the top and bottom direction of the paper refed from the paper refeed stacker 16. The papers discharged from the discharge tray 14 are printed in order of page 1, 2, 3, ... from the bottom, therefore it is not necessary to put pages in order thereafter. When a plurality of copies are to be printed, operations described above are repeated.

Meanwhile, in the foregoing description, though the data are supplied twice from the data supply control device 31 of the host computer 30 to the laser printer 1 successively from the first to last pages, whereby the odd pages are printed on one side at the first time and the even pages are printed on the reverse side at the second time, the data may be supplied twice in order from the last to first pages if the order is the same, or it may be printed on one side first from the even pages.

FIG. 4 is a schematic view explaining the above wherein the image data for six pages are shown. On the left side in FIG. 4, pages to be printed on one side of the paper P by the first data supply and its printing order, and the stacking state of the paper P in the paper refeed stacker 16 are shown, wherein numerals denote number of pages. On the right side in FIG. 4, pages to be printed on the reverse side of the paper P by the second data supply and its printing order, and the stacking state of the paper P in the discharge tray 14 are shown.

Figure 4A:
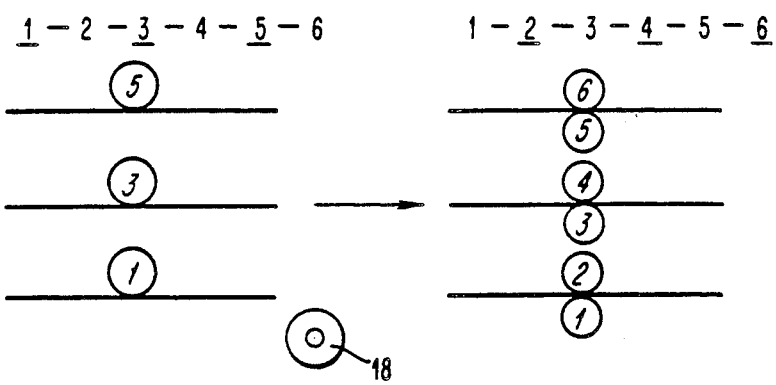
FIGS. 4A–4D are a schematic view showing the sheet stacking state in a paper refeed stacker and a discharge tray in the first embodiment of the present invention.

FIG. 4(a) shows the case of the first embodiment aforementioned, wherein the paper is stacked in order of page 1, 2, 3, ... from the bottom in the discharge tray 14.

Figure 4B:
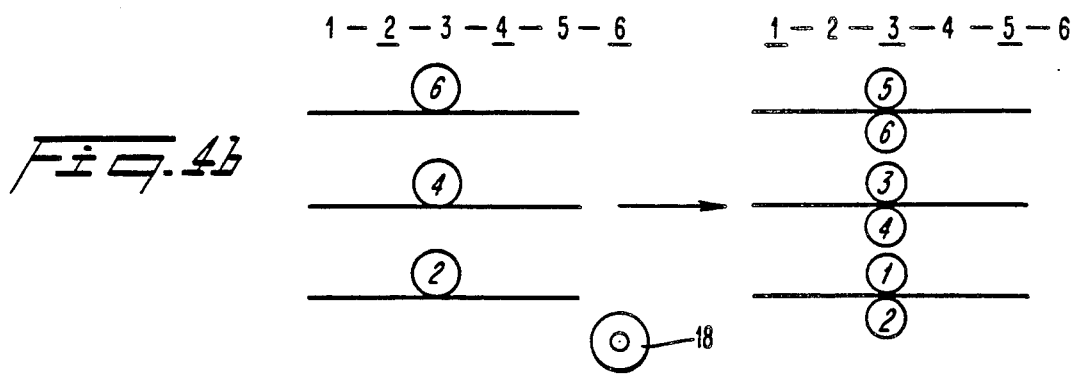

In the case of FIG. 4(b), at the first time the printing begins from the first page of even pages and at the second time, from the first page of odd pages. In this case, the paper is stacked in order of page 2, 1, 4, 3, 6, 5 from the bottom in the discharge tray 14. If the odd page is the last one of whole pages, a sheet of paper is fed to the printing means from the paper cassette 8 lastly to be printed and discharged tray 14.

Figure 4C:
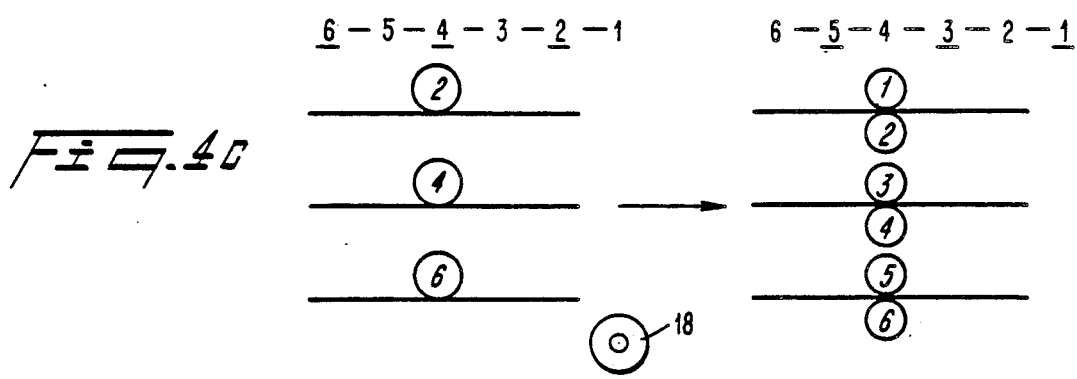

In the case of FIG. 4(c), at the first time the printing begins from the last even page and from the first odd page at the second time. In this case, the paper is stacked in order of page 6, 5, 4, 3, 2, 1 from the bottom in the discharge tray 14. If the odd page is the last one of whole pages, one sheet of paper P is fed from the paper cassette 8 to the paper refeed stacker 16 before printing the even page.

Figure 4D:
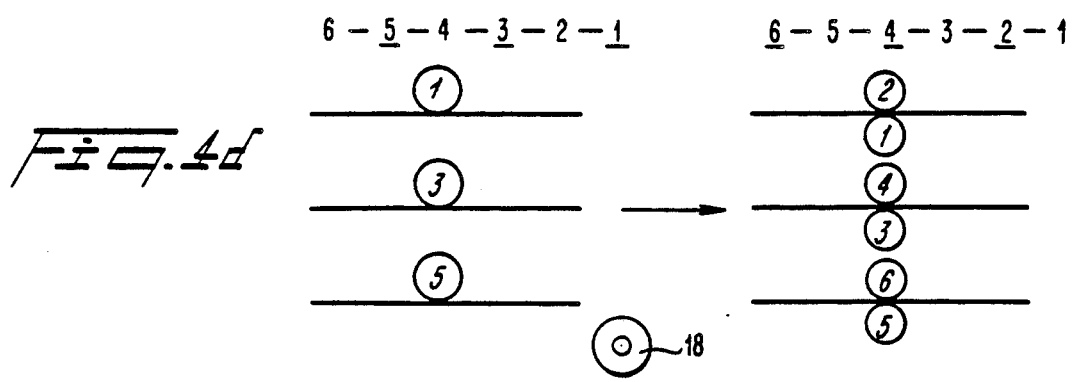

In the case of FIG. 4(d), at the first time the printing begins from the last odd page and from the last even page at the second time. In this case, the paper is stacked in order of page 5, 6, 3, 4, 1, 2 from the bottom in the discharge tray 14. If the odd page is the last one of whole pages, the last page fed to the printing means from the paper refeed stacker 16 at the beginning of second time is discharged to the discharge tray 14 without being printed by the printing means.

Thus, in the cases of FIG. 4(b) and (d), papers discharged to the discharge tray 14 are not in order. In such a case, if necessary, a reversible discharge device may be provided to put pages in order.

FIG. 5 is a sectional view of the laser printer with the reversible discharge device added to the laser printer of the first embodiment, wherein same parts or corresponding members of FIG. 1 are indicated by the same reference characters.

In the drawing, on the discharge side of the discharge roller 12, there is provided the discharge tray 14, above which a discharge gate click 51 for switching the discharged paper P either to the reversible discharge device 50 or to the discharge tray 14 is disposed. Likewise, above the discharge gate click 51, 3 sets of reversible discharge rollers 52, 52, 52 each comprising a pair of rollers are disposed in order to convey the discharged paper P to a reversible discharge tray 53 provided on the laser printer 1. By adding the reversible discharge device 50 thus constructed to the laser printer 1, when pages of the paper P discharged from the laser printer 1 are not in order as the cases shown in FIG. 4(b) and (c), the discharge gate click 53 is switched from the position shown in full lines to the position shown in the broken lines to supply the discharged paper P to the reversible discharge divice 50 so as to be stacked in the reversible discharge tray 53 in order. For example, when the paper P have been discharged in the state shown in FIG. 4(b), they are discharged and stacked in the reversible discharge tray 53 in the state shown in FIG. 4(a). Similarly, in the case shown in FIG. 4(d), they are discharged and stacked in the state shown in FIG. 4(c).

The second embodiment will now be described.

FIG. 6 is a sectional view of the laser printer in the second embodiment, wherein same parts or corresponding members of FIG. 1 are indicated by the same reference character. In the drawing, the numeral 16 denotes the paper refeed stacker 16 provided on the discharge side of discharge roller 20. On the storing side of the paper P of the paper refeed stacker 16, an aligning member 17 for aligning the paper P stored and stacked therein is mounted movably and horizontally by means of a driving means (not shown). Likewise, above the discharge side of the paper refeed stacker 16, the paper refeed roller 18 for feeding the paper P print ed on one side and stored therein to the printing means is disposed, and under the discharge side thereof, a lifting member 19 for lifting the stored paper P in order to contact the upper portion of the paper to the paper refeed roller 18 is disposed pivotally by means of a driving means (not shown).

Differences in constructions between the first and second embodiments are as mentioned hereinabove.

The construction of control device in the second embodiment will not be described as it is as same as that in the first embodiment.

Next, operation of the laser printer will be described.

In the laser printer 1 described heretofore, the paper P in the paper cassette 8 is sent out by the paper feed roller 9 and is fixed by the fix roller 11 after being transferred on one side thereof by the photosensitive drum 2. Then, the paper P is guided by the gate clicks 13a, 13b, and is discharged to the lower discharge tray 15. On its way, the paper P is detected by the sensor (not shown) just before its rear end passes the discharge roller 12 to switch the gate clicks 13a, 13b from the position shown in full lines to the position shown in broken lines shown in FIG. 6. Then, the discharge roller 12 is rotated reversely and the paper P is fed to the paper refeed stacker 16 by the guide roller 20, and stacked therein. When refeeding the paper, the aligning member 17 is moved in the direction of the arrow A to align ends of the paper, the paper then being lifted by the lifting member 19 and refed toward the photosensitive drum 2 by means of the rotation of paper refeed roller 18, and is transferred on the reverse side thereof. Thus duplex printing is completed.

The host computer 30 produces image data for a plurality of pages which are transferred to the laser printer 1 together with the control data by the data supply control device according to prescribed procedures. On the laser printer 1 side, the host interface 41 temporarily stores the data transferred from the host computer 30 in a unit of page, and the control section 42 controls the print engine 44 by the control data out of these data and transfers the image data to the image data processor 43 wherein bit data of the image processed in synchronism with the operation of print engine 44 are transferred thereto. In the print engine 44, laser diode in the optical scanning system 21 previously described is modulated for printing, and on the basis of control data from the control section 42, control of feeding and refeeding the paper P and the other controls and operations necessary for printing are performed (refer to FIG. 2).

Now, from the host computer 30, out of image data to be printed, even pages are transferred in order from its first page (second page), and the laser printer 1 successively prints these image data respectively on one side of the paper fed from the paper cassette 8 and stores them temporarily in the paper refeed stacker 16. Next, from the host computer 30 the odd pages out of image data is transferred in order from its last page through the data supply control device 31. When the page number of the first page (the last odd page) is larger than the last even page, the laser printer 1 feeds the paper from the paper cassette 8 for the page, and in the other case, it supplies the paper from the paper refeed stacker 16 and discharges to the upper discharge tray 14 after printing the image data of odd pages respectively on one side of these papers.

FIG. 7 shows a flow chart of the control section 42 for conducting printing operation aforementioned.

In FIG. 7, it is determined whether or not duplex printing is performed in the Step #1, if no, a subroutine for one side printing is executed and if yes, the Step #2 and the following steps are executed. In the Step #2, data transfer from the host computer 30 is received and the data from even pages are denoted as N=1 and that for the odd pages are denoted as N=0. When the data are of even pages, the paper is fed from the paper cassette 8 (Step #5) and after data processing (Step #6) and printing (Step #7) it is stacked in the paper refeed stacker 16 (Step #9). When the data are of odd pages, the last pages of odd and even pages are compared (Step #13), if the page number of the odd page is larger, only the first page or the last odd page is fed from the paper cassette 8 (Step #14, #5) and in other case the paper is refed from the paper refeed stacker 16 (Step #15). Then, the printed paper is discharged to the discharge tray 14 (Step #10).

Meanwhile, in the image data processor 43, by the control from the control section 42, the image data of odd pages are processed so as to be turned upside down relative to the image data of even pages, thereby the direction of image is brought in agreement with the top and bottom direction of the paper refed from the paper refeed stacker 16. The papers discharged to the discharge tray 14 are printed in order of page 1, 2, 3, . . . from the top, therefore it is not necessary to put the pages in order thereafter. When a plurality of copies are to be printed, operations described above are repeated.

Meanwhile, in the foregoing description of the second embodiment, though the data are supplied twice from the data supply control device 31 of the host computer 30 to the laser printer 1 in order from the first even page to the last even page and from the last odd page to the first odd page, whereby the even pages are printed on one side at the first time and the odd pages are printed on the reverse side at the second time, they may be supplied twice from the last to first pages or from the first to last pages, or the odd pages may be printed first on one side if they are supplied in the different order.

FIG. 8 is a schematic view similar to FIG. 4 illustrating the above operation of the second embodiment, wherein the image data of six pages are shown.

Figure 8A:
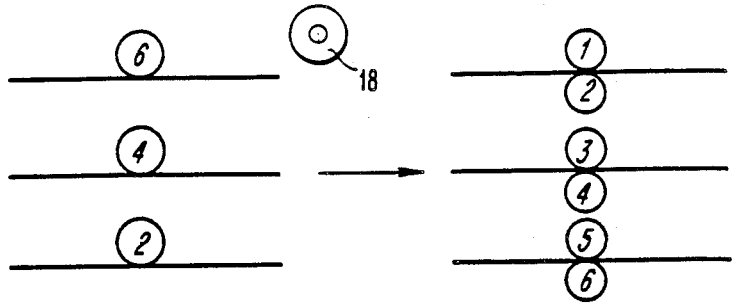
FIGS. 8A–8B are a schematic view showing the sheet stacking state in a paper refeed stacker and a discharge tray in the second embodiment of the present invention.

FIG. 8(a) shows the case of the second embodiment described above, in which it is printed and stacked in the discharge tray 14 in order of page 6, 5, 4, . . . from the bottom.

Figure 8B:
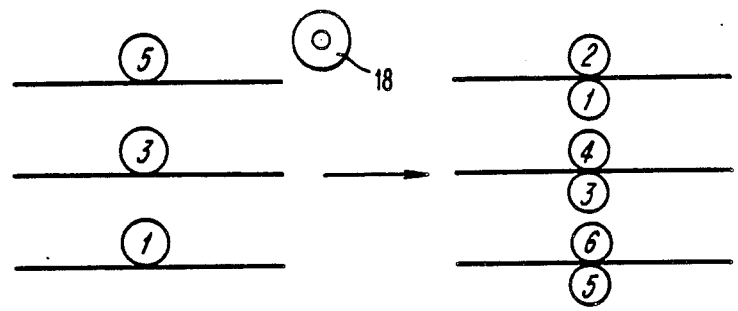

In the case of FIG. 8(b), at the first time the printing begins from the first page of odd pages and at the second time, the printing begins from the last page of odd pages. In this case, the papers are stacked in order of page 5, 6, 3, 4, 1, 2 from the bottom in the discharge tray 14. If the odd page is the last one of whole pages, the last page fed to the printing means from the paper refeed stacker 16 at the beginning of the second time is discharged to the discharge tray 14 without being printed by the printing means.

Figure 8C:
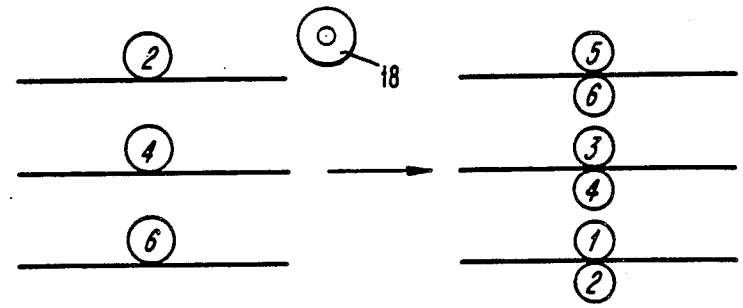

In the case of FIG. 8(c), at the first time the printing begins from the last page of even pages and at the second time, from the first page of odd pages. In this case, the papers are stacked in order of page 2, 1, 4, 3, 6, 5 from the bottom in the discharge tray 14. If the odd page is the last one of whole pages in this case, the paper P is fed to the printing means lastly from the paper cassette 8 and the last page is printed and discharged to the discharge tray 14.

Figure 8D:
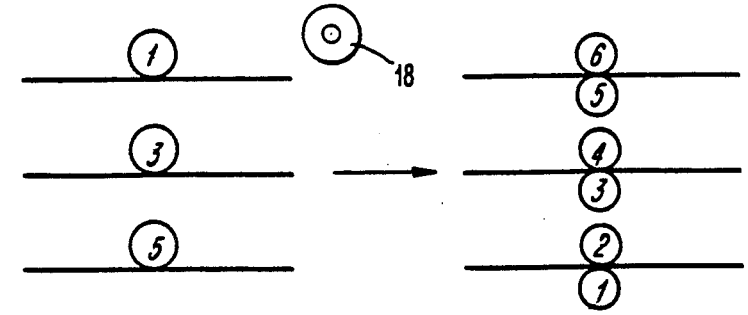

In the case of FIG. 8(d), at the first time the printing begins from the last odd page and from the first even page at the second time. In this case, the papers are stacked in order of page 1, 2, 3, 4, 5, 6 from the bottom in the discharge tray 14. If the last one of whole pages is the odd page, the last page fed to the printing means from the paper refeed stacker 16 at the end of the second time is discharged to the discharge tray 14 without being printed by the printing means.

Thus, in the case of FIGS. 8(b) and (c), papers discharged to the discharged tray 14 are not in order. In such a case, the reversible discharge device 50 may be provided in the same way as the first embodiment to put pages in order.

FIG. 9 is a sectional view of the laser printer with the reversible discharge device added to the laser printer of the second embodiment, wherein the same parts or corresponding members shown in FIGS. 5 and 6 are indicated by the same reference characters. Constructions of the laser printer will not be described as it is as same as that of FIG. 6. By adding the reversible discharge device 50 thus constructed to the laser printer 1, when pages of the paper P discharged are not in order as the cases shown in FIGS. 8(b) and (c), the discharge gate click 53 is switched from the position shown in full lines to the position shown in broken lines to supply the discharged paper P to the reversible discharge device 50 so as to be stacked in the reversible discharge tray 53 in order. For example, when the paper P has been discharged in the state shown in FIG. 8(b), it is discharged and stacked in the reversible discharge tray 53 in the state shown in FIG. 8(d).

As particularly described heretofore, according to the first embodiment, the data are transferred twice simply in the same order from the host computer 30 through the data supply control device 31, thereby the laser printer 1 operates to print at fast speed on the basis of these data and to complete duplex printing in the state where the pages are put in order. Thus, the host computer 30 can easily transfer the data and the laser printer 1 operates to print at fast speed, considerably reducing the duplex printing time besides restraining increase in cost, since image memory for storing the image data sent from the host computer 30 needs only for one page.

Likewise, in the first embodiment, though the data of all pages are transferred twice from the host computer 30 through the data supply control device 31, in the data supply control device 31 of the host computer 30 or in the print control means 40 of the laser printer 1, the data is determined whether it is the even page or odd page such that waste of transferring data of all pages can be avoided by not transferring or printing each data of the even or odd pages at the first time and the odd or even pages at the second time. Also, in the first and second embodiments, for reversing the paper in the laser printer 1, various paper paths may be employed.

Meanwhile, according to the second embodiment, from the host computer 30 the data in different order are transferred twice through the data supply control device 31 from the first or last page of the even or odd pages and the last or first page of the odd or even pages, thereby the laser printer 1 operates to print at fast speed on the basis of these data and to complete duplex printing in the state where the pages are put in order. Thus, also in the second embodiment, as in the first embodiment, the host computer 30 can easily transfer the data, and the laser printer 1 operates to print at high speed, considerable reducing the duplex printing time besides restraining increase in cost since image memory for storing the image data sent from the host computer 30 needs only for one page.

Likewise, in the second embodiment, though the host computer 30 transfers the data twice making a distinction between even pages and odd pages through the data supply control device 31, all pages may be transferred at each time without such a distinction as in the embodiment 1, and in the control section 42 of the laser printer 1, the data is determined whether the even page or odd page such that the odd or even page at the transferring from the first or last page, and the even or odd page at the transferring from the last or first page are ignored and not printed. Thereby, processings for data transfer in the host computer 30 is more simplified.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:
1. A duplex print apparatus comprising:
an image data supply means for supplying image data to be printed;
an image forming means including;
a sheet feed means for feeding a sheet on which said image data are printed,
a print means for printing said supplied image data on said fed sheet,
a store means for reversing and storing said printed sheet, and
a paper refeed means for refeeding said stored sheet to said print means in stored order,
a first control means for controlling said image data supply means in order to output said image data for a plurality of pages;
a second control means for controlling said image forming means in order to print said image data of odd pages outputted from said image data supply means according to the control by said first control means on the sheet fed from said sheet feed means and to store it in said store means;
a third control means for controlling said image data supply means in order to output said image data for a plurality of pages in the same order done by said first control means; and
a fourth control means for controlling said image forming means in order to print said image data of even pages outputted from said image data supply means according to the control by said third control means on said sheet fed by said paper refeed means.

2. A duplex print apparatus as claimed in claim 1 wherein said first control means controls said image data supply means in order to output said image data successively from the first page to the last page.

3. A duplex print apparatus as claimed in claim 2 wherein said first control means controls said image data supply means in order to output only said image data of odd pages.

4. A duplex print apparatus as claimed in claim 2 wherein said third control means controls said image data supply means in order to output only said image data of even pages.

5. A duplex print apparatus as claimed in claim 1 wherein said first control means controls said image data supply means in order to output said image data successively from the last page to the first page.

6. A duplex print apparatus as claimed in claim 5 wherein said first control means controls said image data supply means in order to output only said image data of odd pages.

7. A duplex print apparatus as claimed in claim 5 wherein said third control means controls said image data supply means in order to output only said image data of even pages.

8. A duplex print apparatus comprising:
an image data supply means for supplying image data to be printed;
an image forming means including;
a sheet feed means for feeding a sheet on which said image data are printed,
a print means for printing said supplied image data on said fed sheet,
a store means for reversing and storing said printed sheet, and
a paper refeed means for refeeding said stored sheet to said print means in stored order,
a first control means for controlling said image data supply means in order to output said image data for a plurality of pages;
a second control means for controlling said image forming means in order to print said image data of even pages outputted from said image data supply means according to the control by said first control means on the sheet fed from said sheet feed means and to store it in said store means;
a third control means for controlling said image data supply means in order to output said image data for a plurality of pages in the same order done by said first control means; and
a fourth control means for controlling said image forming means in order to print said image data of odd pages outputted from said image data supply means according to the control by said third control means on said sheet fed by said paper refeed means.

9. A duplex print apparatus as claimed in claim 8 wherein said first control means controls said image data supply means in order to output said image data successively from the first page to the last page.

10. A duplex print apparatus as claimed in claim 9 wherein said first control means controls said image data supply means in order to output only said image data of even pages.

11. A duplex print apparatus as claimed in claim 9 wherein said third control means controls said image data supply means in order to output only said image data of odd pages.

12. A duplex print apparatus as claimed in claim 8 wherein said first controls means control said image data supply means in order to output said image data successively from the last page to the first page.

13. A duplex print apparatus as claimed in claim 12 wherein said first control means controls said image data supply means in order to output only said image data of even pages.

14. A duplex print apparatus as claimed in claim 12 wherein said third control means controls said image data control means in order to output only said image data of odd pages.

15. A duplex print apparatus comprising:
an image data supply means for supplying image data to be printed;
an image forming means including;
a sheet feed means for feeding a sheet on which said image data are printed,
a print means for printing said supplied image data on said fed sheet,
a store means for reversing and storing said printed sheet,
a paper refeed means for refeeding said stored sheet to said print means in reverse to the stored order,
a first control means for controlling said image data supply means in order to output said image data for a plurality of pages;
a second control means for controlling said image forming means in order to print said image data of odd pages outputted from said image data supply means according to the control by said first control means on the sheet fed from said sheet feed means and to store it in said store means;
a third control means for controlling said image data supply means in order to output said image data for a plurality of pages in reverse to order done by said first control means; and
a fourth control means for controlling said image forming means in order to print said image data of even pages outputted from said image data supply means according to the control by said third control means on said sheet fed by said refeed paper means.

16. A duplex print apparatus as claimed in claim 15 wherein said first control means controls said image data supply means in order to output said image data successively from the first page to the last page.

17. A duplex print apparatus as claimed in claim 16 wherein said first control means controls said image data supply means in order to output only said image data of odd pages.

18. A duplex print apparatus as claimed in claim 16 wherein said third control means controls said image data supply means in order to output only said image data of even pages.

19. A duplex print apparatus as claimed in claim 15 wherein said first control means controls said image data supply means in order to output said image data successively from the last page to the first page.

20. A duplex print apparatus as claimed in claim 19 wherein said first control means controls said image data supply means in order to output only said image data of odd pages.

21. A duplex print apparatus as claimed in claim 19 wherein said third control means controls said image data supply means in order to output only said image data of even pages.

22. A duplex print apparatus comprising:
an image data supply means for supplying image data to be printed;
an image forming means including;
a sheet feed means for feeding a sheet on which said image data are printed,
a print means for printing said supplied image data on said fed sheet,
a store means for reversing and storing said printed sheet, and
a paper refeed means for refeeding said stored sheet to said print means in reverse to stored order,
a first control means for controlling said image data supply means in order to output said image data for a plurality of pages;
a second control means for controlling said image forming means in order to print said image data of even pages outputted from said image data supply means according to the control by said first control means on the sheet fed from said sheet feed means and to store it in said means;

a third control means for controlling said image data supply means in order to output said image data for a plurality of pages in reverse to order done by said first control means; and a fourth control means for controlling said image forming means in order to print said image data of odd pages outputted from said image data supply means according to the control by said third control means on said sheet fed by said paper refeed means.

23. A duplex print apparatus as claimed in claim 22 wherein said first control means controls said image data supply means in order to output said image data successively from the first page to the last page.

24. A duplex print apparatus as claimed in claim 23 wherein said first control means controls said image data supply means in order to output only said image data of even pages.

25. A duplex print apparatus as claimed in claim 23 wherein said third control means controls said image data supply means in order to output only said image data of odd pages.

26. A duplex print apparatus as claimed in claim 22 wherein said first control means controls said image data supply means in order to output said image data successively from the last page to the first page.

27. A duplex print apparatus as claimed in claim 26 wherein said first control means controls said image data supply means in order to output only said image data of even pages.

28. A duplex print apparatus as claimed in claim 26 wherein said third control means control said image data supply means in order to output only said image data of odd pages.

29. A duplex print apparatus comprising:

an image data supply means for supplying image data to be printed;

an image forming means including;

a sheet feed means for feeding a sheet on which said image data are printed, a print means for printing said supplied image data on said fed sheet, a store means for reversing and storing said printed sheet, and a paper refeed means for refeeding said stored sheet to said print means in the prescribed order, a supply control means for controlling said image data supply means in order to output image data for a plurality of pages twice in the predetermined order; and a print control means for controlling said image forming means in order to print said image data by the first output from said image data supply means according to said supply control means on each sheet fed from said sheet feed means by every other page, to store it in said store mean, and to print remained pages on the sheets fed by said paper refeed means by the other output in said prescribed order.

30. A duplex print apparatus comprising:

an image data supply means for supplying image data to be printed;

an image forming means including;

a sheet feed means for feeding a sheet on which said image data is printed, a print means for printing said supplied image data on said fed sheet, a store means for reversing and storing said printed sheet, and a paper refeed means for refeeding said stored sheet to said print means in stored order, a supply control means for controlling said image data supply means in order to output image data for a plurality of pages twice in the same order; and a print control means for controlling said image forming means in order to print said image data of even pages or odd pages on sheets fed from said sheet feed means by the first output of image data from said image data supply means according to said supply control means, to store it in said store means, and to print remained pages on sheets fed by said paper refeed means by the other output in order stored in said store means.

31. A duplex print apparatus comprising:

an image data supply means for supplying image data to be printed;

an image forming means including;

a sheet feed means for feeding a sheet on which said image data are printed, a print means for printing said supplied image data on said fed sheet, a store means for reversing and storing said printed sheet, and a paper refeed means for refeeding said stored sheet to said print means in reverse to stored order, a supply control means for controlling said image data supply mean in order to output image data for a plurality of pages twice in the different order; and a print control means for controlling said image forming means in order to print said image data of even pages or odd pages on sheets fed from said sheet feed means by the first output of image data from said image data supply means according to said supply control means, to store it in said store means, and to print remained pages on sheets fed by said paper refeed means by the other output in reverse to order stored in said store means.

* * * * *